(12) United States Patent
Kamigaito

(10) Patent No.: US 9,003,749 B2
(45) Date of Patent: Apr. 14, 2015

(54) FORM-FILL-SEAL MACHINE

(75) Inventor: Satoru Kamigaito, Omihachiman (JP)

(73) Assignee: Ishida Co., Ltd., Kyoto (JP)

( * ) Notice: Subject to any disclaimer, the term of this patent is extended or adjusted under 35 U.S.C. 154(b) by 427 days.

(21) Appl. No.: 13/490,876

(22) Filed: Jun. 7, 2012

(65) Prior Publication Data

US 2012/0311975 A1 Dec. 13, 2012

(30) Foreign Application Priority Data

Jun. 10, 2011 (JP) ................................. 2011-129907

(51) Int. Cl.
| | |
|---|---|
| *B65B 57/04* | (2006.01) |
| *B65B 57/02* | (2006.01) |
| *B65B 9/08* | (2012.01) |
| *B29C 65/08* | (2006.01) |
| *B29C 65/00* | (2006.01) |

(Continued)

(52) U.S. Cl.
CPC ................ *B29C 65/08* (2013.01); *B65B 57/02* (2013.01); *B29C 66/1122* (2013.01); *B29C 66/4322* (2013.01); *B29C 66/49* (2013.01); *B29C 66/8242* (2013.01); *B29C 66/849* (2013.01); *B29C 66/872* (2013.01); *B29C 66/8746* (2013.01); *B29C 66/9231* (2013.01); *B29C 66/9511* (2013.01); *B65B 51/225* (2013.01); *B65B 51/26* (2013.01); *B65B 51/306* (2013.01); *B65B 57/04* (2013.01); *B65B 57/08* (2013.01); *B29C 66/73921* (2013.01); *B29C 66/83411* (2013.01); *B29C 66/95* (2013.01); *B65B 9/207* (2013.01); *B29C 66/81431* (2013.01); *B29C 66/9512* (2013.01); *B29C 66/9516* (2013.01); *B29C 66/9515* (2013.01)

(58) Field of Classification Search
USPC ............. 53/505, 52, 450, 451, 452, 456, 545, 53/550–551, 64
IPC ............. B65B 57/00,57/02, 57/04, 57/08, 9/00, B65B 9/06, 9/08, 9/10
See application file for complete search history.

(56) References Cited

U.S. PATENT DOCUMENTS

| | | | | |
|---|---|---|---|---|
| 4,047,992 | A | * | 9/1977 | Williams et al. ............. 156/73.1 |
| 4,445,064 | A | * | 4/1984 | Bullis ....................... 310/316.01 |

(Continued)

FOREIGN PATENT DOCUMENTS

| | | |
|---|---|---|
| DE | 102004012098 B3 | 8/2005 |
| EP | 0950608 A1 | 10/1999 |
| JP | 2001-233309 A | 8/2001 |

OTHER PUBLICATIONS

Extended European Search Report of the corresponding European Patent Application No. 12004382.3, dated Oct. 5, 2012.

*Primary Examiner* — Christopher Harmon
(74) *Attorney, Agent, or Firm* — Global IP Counselors, LLP

(57) ABSTRACT

A form-fill-seal machine includes a vertical sealing mechanism, a first film detection sensor, and a controller. The vertical sealing mechanism has a horn, an anvil, and an ultrasonic transmitter. The vertical sealing mechanism sandwiches a cylindrical film conveyed by a pull-down belt mechanism, by the horn and the anvil, and seals the cylindrical film by applying ultrasonic vibrations to the cylindrical film. The first film detection sensor detects whether the cylindrical film is sandwiched by the horn and the anvil. The controller stops the ultrasonic transmitter in a circumstance in which the first film detection sensor detects that the cylindrical film is not sandwiched by the horn and the anvil.

6 Claims, 6 Drawing Sheets

(51) Int. Cl.
  *B65B 51/22* (2006.01)
  *B65B 51/26* (2006.01)
  *B65B 57/08* (2006.01)
  *B65B 9/207* (2012.01)
  *B65B 51/30* (2006.01)

(56) References Cited

U.S. PATENT DOCUMENTS

| | | | | |
|---|---|---|---|---|
| 4,631,685 A | * | 12/1986 | Peter | 700/212 |
| 4,696,425 A | * | 9/1987 | Landes | 228/1.1 |
| 6,732,496 B1 | | 5/2004 | Wessman et al. | |
| 6,751,925 B1 | * | 6/2004 | Kinoshita et al. | 53/51 |
| 7,448,189 B2 | * | 11/2008 | Kinoshita et al. | 53/551 |
| 8,137,253 B2 | * | 3/2012 | Chiu et al. | 493/226 |
| 8,156,984 B2 | * | 4/2012 | Wieduwilt et al. | 156/378 |
| 2008/0236105 A1 | | 10/2008 | Brormann et al. | |
| 2010/0282395 A1 | | 11/2010 | Volger et al. | |

* cited by examiner

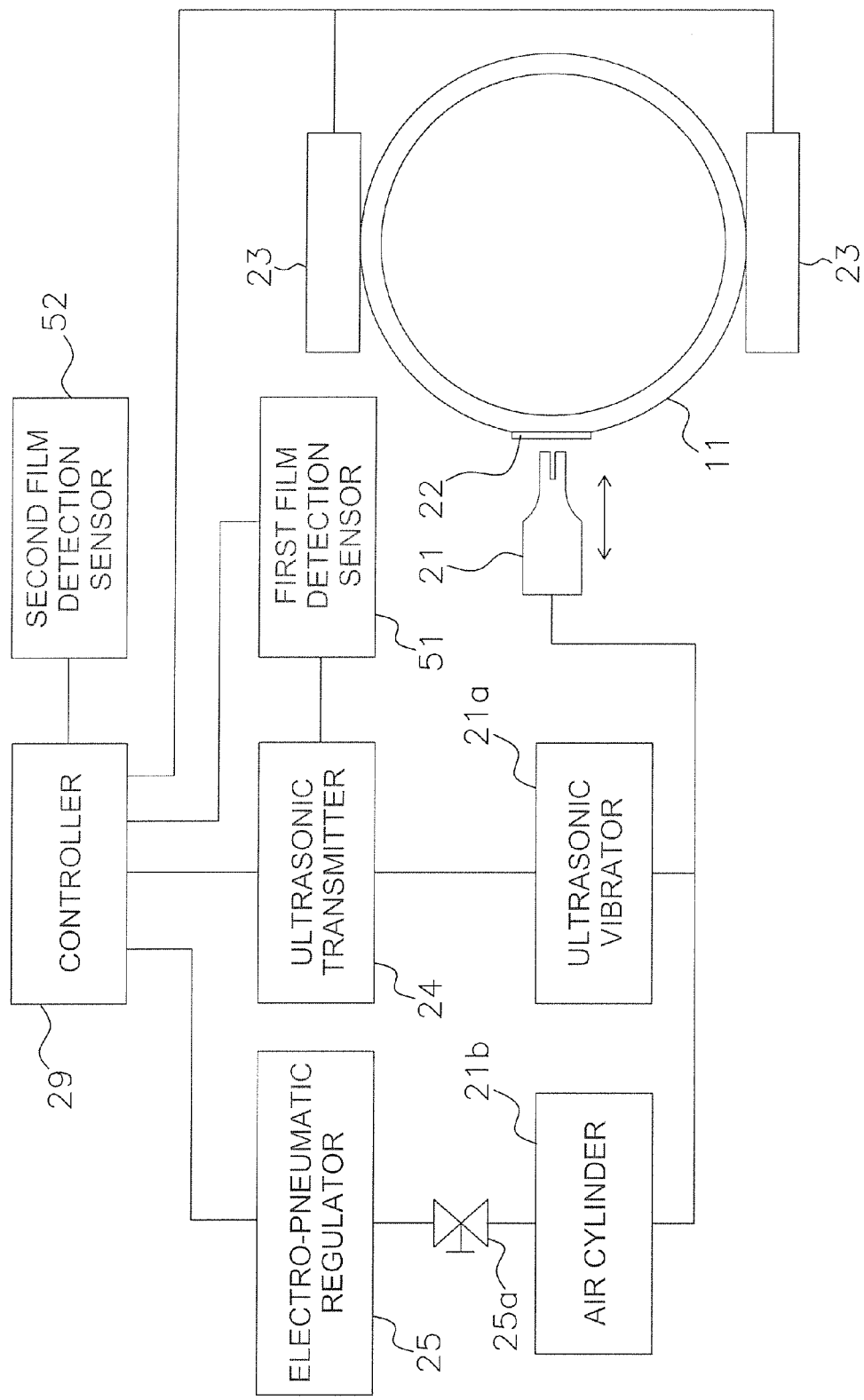
F I G. 3

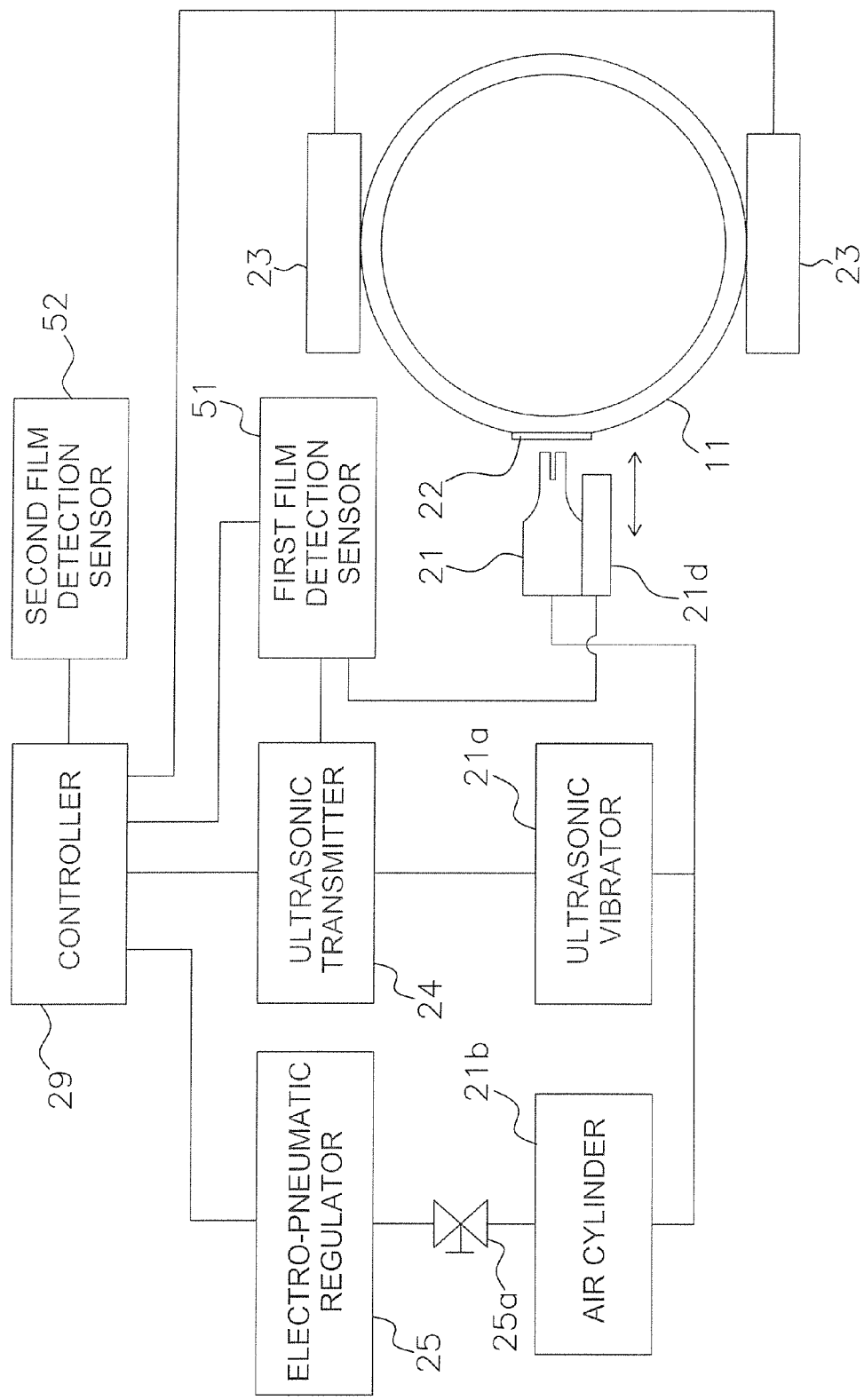
F I G. 5

FORM-FILL-SEAL MACHINE

TECHNICAL FIELD

The present invention relates to a form-fill-seal machine.

BACKGROUND ART

A form-fill-seal machine provided with an ultrasonic sealing device is conventionally used as a form-fill-seal machine for forming a bag from a film-shaped packaging material and filling the bag with candy or another object to be bagged, as shown in Japanese Unexamined Patent Application Publication No. 2001-233309. The ultrasonic sealing device applies fine ultrasonic vibrations to the thermoplastic packaging material to cause the packaging material to fuse, and applies pressure to the packaging material to seal the packaging material. The ultrasonic sealing device usually sandwiches the packaging material using two metal components referred to as a horn and an anvil, and seals the packaging material using ultrasonic vibrations transmitted to the horn by an ultrasonic transmitter.

SUMMARY OF INVENTION

Technical Problem

However, the anvil contacting the distal end surface of the horn directly receives the ultrasonic vibrations of the horn in a circumstance in which the ultrasonic vibrations are transmitted to the horn in a state in which the packaging material is not sandwiched by the horn and the anvil. There is concern that the horn and the anvil will thereby deteriorate.

An object of the present invention is to provide a form-fill-seal machine in which deterioration of components can be prevented.

Solution to Problem

A form-fill-seal machine according to the present invention comprises a conveyor, a sealer, a first detector, and a controller. The conveyor conveys a cylindrical packaging material. The sealer has a horn, an anvil, and an ultrasonic unit. The ultrasonic unit is linked to the horn, and transmits ultrasonic vibrations to the horn. The sealer sandwiches the packaging material conveyed by the conveyer between the horn and the anvil, and applies ultrasonic vibrations to the packaging material to seal the packaging material. The first detector detects whether the packaging material is sandwiched by the horn and the anvil. The controller stops the ultrasonic unit in a circumstance in which the first detector detects that the packaging material is not sandwiched by the horn and the anvil.

The form-fill-seal machine according to the present invention has an ultrasonic sealing mechanism for sealing the packaging material by applying ultrasonic vibrations and pressure to the packaging material sandwiched by the horn and the anvil. The form-fill-seal machine is provided with a first detector for detecting whether the packaging material is sandwiched by the horn and the anvil. The anvil, which is in contact with the distal end surface of the horn, directly receives the ultrasonic vibrations of the horn when the horn ultrasonically vibrates in a circumstance in which the packaging material is not sandwiched by the horn and the anvil. There is a possibility that the horn and the anvil will thereby deteriorate. In the form-fill-seal machine according to the present invention, the controller stops the functioning of the ultrasonic unit and stops the ultrasonic vibrations of the horn in a circumstance in which the first detector has detected that the packaging material is not sandwiched by the horn and the anvil. Accordingly, deterioration of components can be prevented in the form-fill-seal machine according to the present invention.

In addition, in the form-fill-seal machine according to the present invention, the first detector preferably detects whether the packaging material is sandwiched by the horn and the anvil on the basis of a change in the state of the ultrasonic vibrations transmitted to the horn by the ultrasonic unit. In this mode, the first detector monitors in real time the output value of the ultrasonic unit in relation to the frequency of the ultrasonic vibrations transmitted to the horn by the ultrasonic unit. The first detector then detects whether the packaging material is sandwiched by the horn and the anvil on the basis of a deviation in the output value of the frequency of the ultrasonic unit. For example, the output value of the frequency of the ultrasonic unit considerably deviates in a circumstance in which the packaging material is not sandwiched by the horn and the anvil. In this circumstance, the first detector senses a deviation in the output value of the frequency of the ultrasonic unit, and detects that the packaging material is not sandwiched by the horn and the anvil.

In addition, in the form-fill-seal machine according to the present invention, the first detector preferably detects whether the packaging material is sandwiched by the horn and the anvil on the basis of a change in distance between the anvil and the horn. In this mode, the first detector monitors the distance between the horn and the anvil in real time. The first detector then detects whether the packaging material is sandwiched by the horn and the anvil on the basis of a deviation in the distance between the horn and the anvil. For example, the horn is in contact with the anvil in a circumstance in which the packaging material is not sandwiched by the horn and the anvil. In this circumstance, the first detector senses that the distance between the horn and the anvil is zero, and detects that the packaging material is not sandwiched by the horn and the anvil.

In addition, in the form-fill-seal machine according to the present invention, the first detector preferably detects whether the packaging material is sandwiched by the horn and the anvil on the basis of a change in electric resistance between the horn and the anvil. In this mode, the first detector monitors the electric resistance between the horn and the anvil in real time. The first detector then detects whether the packaging material is sandwiched by the horn and the anvil on the basis of a deviation in the electric resistance between the horn and the anvil. For example, electricity passes between the horn and the anvil because the horn is in contact with the anvil in a circumstance in which the packaging material is not sandwiched by the horn and the anvil. In this circumstance, the first detector senses that the electric resistance between the horn and the anvil is low, and detects that the packaging material is not sandwiched by the horn and the anvil.

In addition, in the form-fill-seal machine according to the present invention, the controller further preferably stops conveyance of the packaging material by the conveyor in a circumstance in which the first detector detects that the packaging material is not sandwiched by the horn and the anvil. In this mode, the controller stops not only the functioning of the ultrasonic unit, but also stops conveyance of the packaging material in a circumstance in which the packaging material is not sandwiched by the horn and the anvil.

In addition, the form-fill-seal machine according to the present invention preferably further comprises a second detector. The second detector detects whether the packaging material is sandwiched by the horn and the anvil. In this mode, the controller further stops the ultrasonic unit and stops conveyance of the packaging material in a circumstance in which the second detector detects that the packaging material is not sandwiched by the horn and the anvil. In this mode, the form-fill-seal machine is provided with not only the first detector for monitoring the output value of the frequency of the ultrasonic unit and detecting whether the packaging material is sandwiched by the horn and the anvil, but also with the second detector, which is another detection mechanism for detecting whether the packaging material is sandwiched by the horn and the anvil.

Advantageous Effects of Invention

Deterioration of components can be prevented in the form-fill-seal machine according to the present invention.

BRIEF DESCRIPTION OF THE DRAWINGS

FIG. 3 is a block diagram of the vertical sealing mechanism according to an embodiment of the present invention.

FIG. 5 is an example of a block diagram of the vertical sealing mechanism according to modification D of the present invention.

DESCRIPTION OF EMBODIMENTS

An embodiment of the present invention will be described with reference to the drawings. The embodiment described below is a single specific example of the present invention and does not limit the technical scope of the present invention.

(1) Configuration of Form-Fill-Seal Machine

Figure 1:
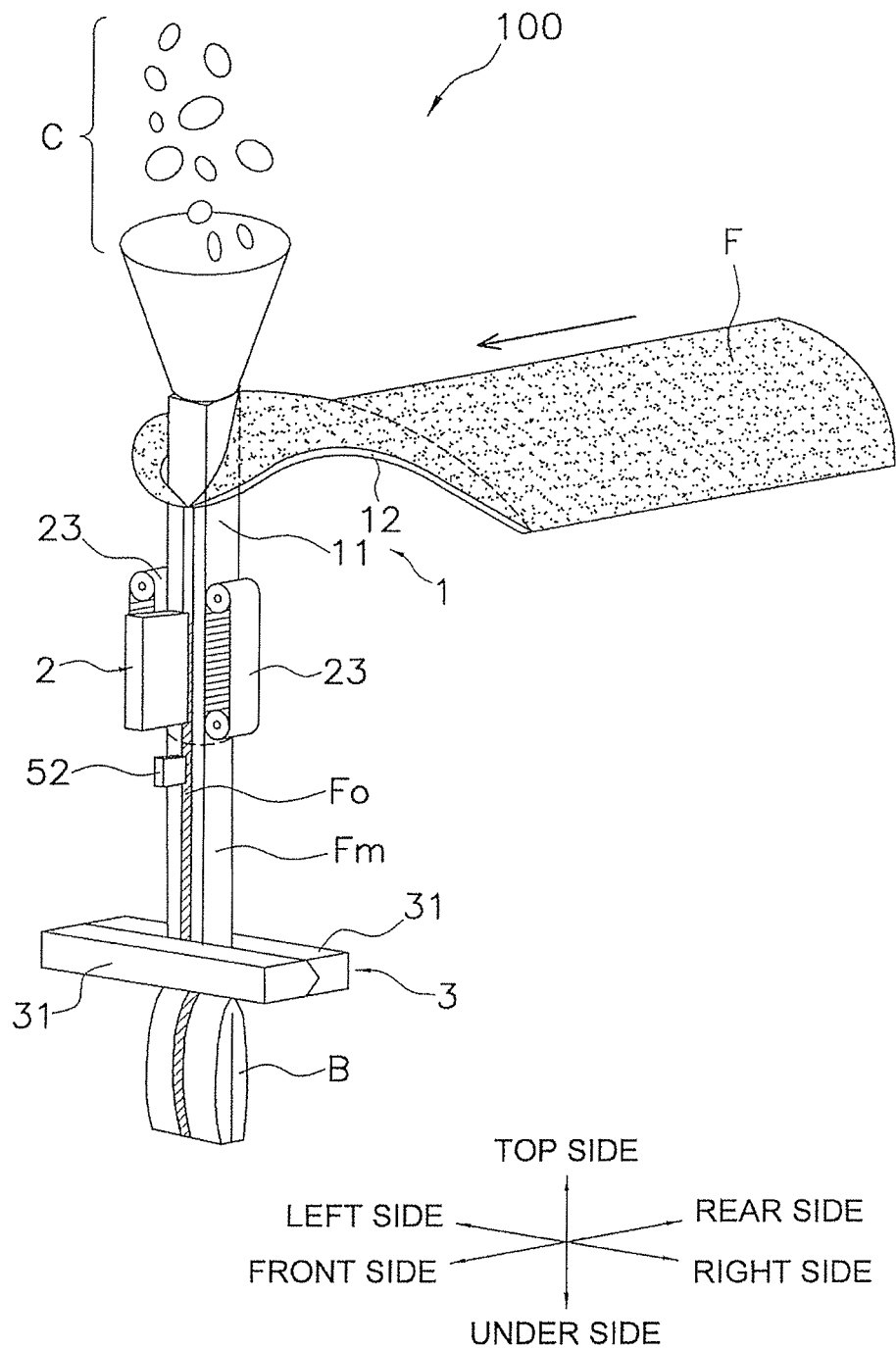
FIG. 1 is a schematic configuration diagram of a form-fill-seal machine according to an embodiment of the present invention.

FIG. 1 shows a schematic configuration diagram of a form-fill-seal machine 100 according to an embodiment of the present invention. The form-fill-seal machine 100 is a machine for covering potato chips or another item to be bagged with a cylindrically formed film and sealing the film in the vertical and lateral directions to manufacture a bag in which the item to be bagged is contained.

The form-fill-seal machine 100 mainly has a film feeder (not shown) for feeding a thermoplastic film F, which is the packaging material; a forming mechanism 1 for cylindrically forming the film F sent in the form of a sheet from the film feeder; a vertical sealing mechanism 2 for sealing an overlapping portion Fo of the cylindrically formed film F (hereinafter referred to as "cylindrical film Fm") in the vertical direction; and a lateral sealing mechanism 3 for sealing the cylindrical film Fm in the lateral direction, as shown in FIG. 1.

(1-1) Forming Mechanism

The forming mechanism 1 has a tube 11 and a former 12. The tube 11 is a tubular member in which the upper and lower ends are open. The items to be bagged are deposited in the opening of the upper end of the tube 11. In the present embodiment, potato chips C are used as an example of the items to be bagged. The former 12 is disposed so as to encircle the tube 11. The former 12 has a shape in which the sheet-shaped film F sent from the film feeder is formed into the cylindrical film Fm when the film F passes between the former 12 and the tube 11. The cylindrical film Fm has an overlapping portion Fo in which both end parts of the film F in the horizontal direction overlap each other. The overlapping portion Fo of the cylindrical film Fm is formed so as to extend in the longitudinal direction of the tube 11. The tube 11 and the former 12 can be exchanged in accordance with the size of the bag to be manufactured.

In addition, a pull-down belt mechanism 23 is provided to the left and right of the tube 11 when viewed from the front surface of the form-fill-seal machine 100, as shown in FIG. 1. The pull-down belt mechanism 23 engages the cylindrical film Fm that is wrapped around the tube 11, and conveys the film downward.

(1-2) Vertical Sealing Mechanism

Figure 2:
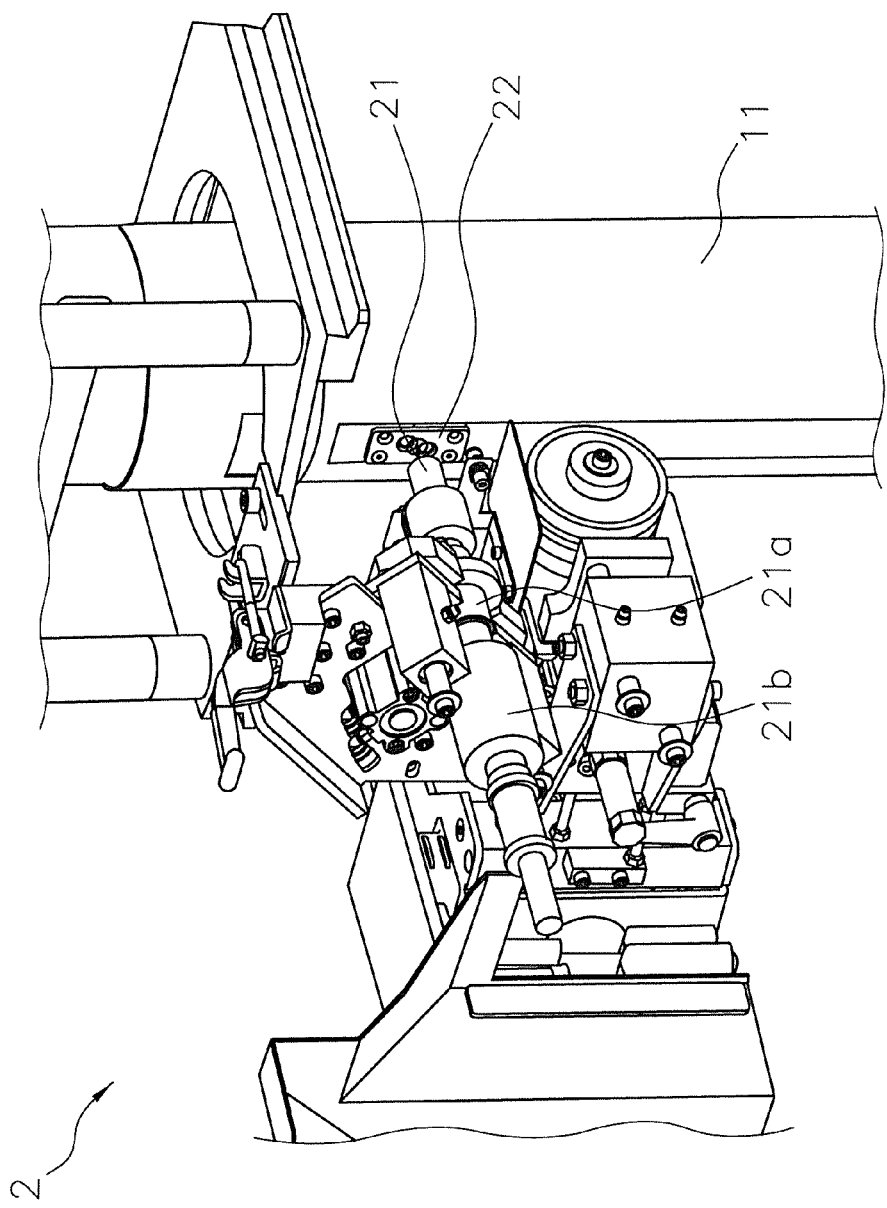
FIG. 2 is an external view of a vertical sealing mechanism of the form-fill-seal machine according to an embodiment of the present invention.

The vertical sealing mechanism 2 is a mechanism in which vertical sealing is performed by applying ultrasonic vibrations and pressure to the overlapping portion Fo of the cylindrical film Fm that is downwardly conveyed by the pull-down belt mechanism 23. FIG. 2 shows an external view of the vertical sealing mechanism 2. The vertical sealing mechanism 2 has a horn 21 and an anvil 22. The horn 21 is a metal member linked to an ultrasonic vibrator 21a and an air cylinder 21b. The ultrasonic vibrator 21a is, for example, an element in which a piezoelectric ceramic is inserted between electrodes, and the piezoelectric ceramic is made to vibrate by applying voltage to generate ultrasonic waves. The piezoelectric ceramic is a polycrystalline ceramic in which a high-purity powder such as titanium oxide and/or barium oxide is sintered at a high temperature and polarized. The air cylinder 21b is a cylindrical machine for converting compressed-air energy fed to the interior thereof into translational movement of the air cylinder 21b in the longitudinal direction. The anvil 22 is a metal member mounted to the external peripheral surface of the tube 11 and disposed facing the distal end surface of the horn 21.

The horn 21 induces ultrasonic vibrations by transmitting the ultrasonic waves generated by the ultrasonic vibrator 21a. The horn 21 undergoes reciprocating movement toward and away from the anvil 22 in accordance with the controlling of air pressure inside of the air cylinder 21b. The horn 21, together with the anvil 22, sandwiches the cylindrical film Fm, causes the cylindrical film Fm to be heated and melted by the ultrasonic vibrations of the horn, and applies pressure by pressing the cylindrical film Fm toward the anvil 22. The overlapping portion Fo of the cylindrical film Fm is thereby fused and sealed.

FIG. 3 shows a block diagram of the vertical sealing mechanism 2. The vertical sealing mechanism 2 is composed of a horn 21, an ultrasonic vibrator 21a, an air cylinder 21b, an anvil 22, an ultrasonic transmitter 24, an electro-pneumatic regulator 25, a first film detection sensor 51, a second film detection sensor 52, and a controller 29. The constituent elements other than the aforementioned horn 21, ultrasonic vibrator 21a, air cylinder 21b, and anvil 22 are described below.

The ultrasonic transmitter 24 is a unit for causing the ultrasonic vibrations of the ultrasonic vibrator 21a and transmitting the ultrasonic vibrations to the horn 21. The ultrasonic transmitter 24 can control the state of the ultrasonic vibrations, such as the frequency and/or amplitude of the ultrasonic vibrations. The ultrasonic transmitter 24 causes the frequency of the ultrasonic vibrations transmitted to the horn 21 to automatically conform to a resonant frequency using a circuit in which the phase difference of the current and the voltage applied to the ultrasonic vibrator 21a is set to zero.

The electro-pneumatic regulator 25 is a device for sending air fed from an air source (not shown) to the air cylinder 21b via a solenoid valve 25a, and controlling the air pressure inside of the air cylinder 21b. Specifically, the electro-pneumatic regulator 25 can control the pressure applied to the cylindrical film Fm that is sandwiched by the horn 21 and the anvil 22.

The first film detection sensor 51 is a unit connected to the ultrasonic transmitter 24 and used to monitor in real time the output value of the ultrasonic transmitter 24 in relation to the state of the ultrasonic vibrations transmitted by the ultrasonic transmitter 24 to the horn 21. In the present embodiment, the state of the ultrasonic vibrations expresses, for example, the frequency of the ultrasonic vibrations. The first film detection sensor 51 detects whether the cylindrical film Fm is sandwiched by the horn 21 and the anvil 21 in response to a deviation in the output value of the frequency of the ultrasonic transmitter 24, as described below.

The second film detection sensor 52 is a unit for detecting the presence of the cylindrical film Fm downwardly conveyed by the pull-down belt mechanism 23. The second film detection sensor 52 is mounted in the vicinity of the external peripheral surface of the tube 11. In the present embodiment, a photoelectric sensor is used as an example of the second film detection sensor 52. The photoelectric sensor is a non-contact sensor for radiating visible rays, infrared rays, and/or other light toward the cylindrical film Fm, which is the object to be sensed, and detecting the presence or absence of the cylindrical film Fm by sensing a change or changes in the luminous energy of the light reflected from the cylindrical film Fm.

The controller 29 is a computer for controlling the operation of the pull-down belt mechanism 23, ultrasonic transmitter 24, electro-pneumatic regulator 25, first film detection sensor 51, and second film detection sensor 52. In response to the first film detection sensor 51 or the second film detection sensor 52 detecting that the cylindrical film Fm is not present (is not detected by one of the sensors), the controller 29 stops the functioning of the ultrasonic transmitter 24 to stop the ultrasonic vibrations of the horn 21, and stops conveyance of the cylindrical film Fm by the pull-down belt mechanism 23.

(1-3) Lateral Sealing Mechanism

The lateral sealing mechanism 3 is disposed below the forming mechanism 1 and the vertical sealing mechanism 2. The lateral sealing mechanism 3 has a pair of sealing jaws 31 that houses a heater. The pair of sealing jaws 31 is disposed on the front and back, respectively, of the cylindrical film Fm when viewed from the front of the form-fill-seal machine 100. The pair of sealing jaws 31 spins so that each plots out a substantially D-shaped trajectory that is symmetrical in front and back. The pair of sealing jaws 31 sandwiches the cylindrical film Fm in a mutually pressing state midway through rotation, and applies pressure and heat to the portions of the cylindrical film Fm that subsequently become the upper and lower end parts of a bag B to perform sealing.

A cutter (not shown) is housed inside of one of the sealing jaws 31. The cutter detaches the bag B and the succeeding cylindrical film Fm at a center position in the height direction of the portion laterally sealed by the sealing jaws 31.

(2) Operation of Form-Fill-Seal Machine

The potato chips C, which are the items to be bagged, are weighed to a predetermined weight by a weighing machine (not shown) provided above the form-fill-seal machine 100, and are deposited inside of the tube 11 of the forming mechanism 1. The film F (the packaging material) is transported in the form of a sheet from the film feeder, and is shaped by the forming mechanism 1 into a cylindrically shaped tube hereinafter referred to as the cylindrical film Fm. The formed cylindrical film Fm is downwardly conveyed by the pull-down belt mechanism 23, and vertically sealed by the vertical sealing mechanism 2.

In the vertical sealing mechanism 2, the horn 21 induces ultrasonic vibrations using the ultrasonic transmitter 24. The overlapping portion Fo of the cylindrical film Fm that is sandwiched between the horn 21 and the anvil 22 receives the energy of the ultrasonic vibrations from the horn 21 and is heated. Pressure is applied to the heated and melted overlapping portion Fo of the cylindrical film Fm by sandwiching the overlapping portion Fo between the horn 21 and the anvil 22. The overlapping portion Fo of the cylindrical film Fm is thereby fused and sealed. In the process of vertically sealing the cylindrical film Fm, the controller 29 controls: the output value of the pull-down belt mechanism 23 in relation to the speed of the downwardly conveyed cylindrical film Fm; the output value of the ultrasonic transmitter 24 in relation to the frequency of the ultrasonic vibrations transmitted to the horn 21; and the output value of the electro-pneumatic regulator 25 in relation to the air pressure inside of the air cylinder 21b.

The portions that are the upper and lower end parts of the bag B are laterally sealed by the lateral sealing mechanism 3 after the cylindrical film Fm is vertically sealed by the vertical sealing mechanism 2. Initially, the portion that is the lower end part of the bag B is laterally sealed, and the potato chips C in the tube 11 are deposited inside of the cylindrical film Fm. The portion that is the upper end part of the bag B is then laterally sealed, and the center position in the height direction of the laterally sealed portion is cut by the cutter housed in the sealing jaws 31. The bag B is thereby detached from the succeeding portion of the cylindrical film Fm (the packaging material).

(3) Operation of Film Detection Mechanism

Next, the operation will be described in which the first film detection sensor 51 and the second film detection sensor 52 detect the cylindrical film Fm when the vertical sealing mechanism 2 ultrasonically seals the cylindrical film Fm. In the present embodiment, the second film detection sensor 52 is the main film detection mechanism, and the first film detection sensor 51 is a film detection mechanism acting as a backup for the second film detection sensor 52.

The second film detection sensor 52 detects the presence or absence of the downwardly conveyed cylindrical film Fm wrapped around the tube 11 in a height position lower than the height position of the horn 21 and the anvil 22. The second film detection sensor 52, which is a photoelectric sensor, radiates infrared or other light toward the tube 11 and receives reflected light. A difference in luminous energy or other physical properties exists between the light reflected by the tube 11 when the cylindrical film Fm is not wrapped around the tube 11, and the light reflected by the cylindrical film Fm when the cylindrical film is wrapped around the tube 11. The second film detection sensor 52 receives the reflected light of the light radiated toward the tube 11, and detects the presence or absence of the cylindrical film Fm. In response to the second film detection sensor 52 detecting the absence of the cylindrical film Fm, the controller 29 performs a control operation for stopping the ultrasonic transmitter 24 and the pull-down belt mechanism 23.

The first film detection sensor 51 detects the presence or absence of the cylindrical film Fm sandwiched by the horn 21 and the anvil 22. The first film detection sensor 51 is a backup unit for providing detection in circumstances in which the second film detection sensor 52 fails or does not operate normally. The first film detection sensor 51 monitors the output value of the frequency of the ultrasonic transmitter 24 in real time and senses a deviation in the output value.

A majority of the ultrasonic vibration energy of the horn 21 is absorbed by the cylindrical film Fm when the cylindrical film Fm is sandwiched by the horn 21 and the anvil 22. The part of the ultrasonic vibration energy that was not absorbed by the cylindrical film Fm affects the frequency of the ultrasonic vibrations of the horn 21. However, the ultrasonic transmitter 24 attempts to control the output value of the frequency so as to stably maintain the frequency of the ultrasonic vibrations of the horn 21. The ultrasonic vibration energy that affects the frequency of the ultrasonic vibrations of the horn 21 is small when the cylindrical film Fm is sandwiched by the horn 21 and the anvil 22, and the output value of the frequency of the ultrasonic transmitter 24 does not therefore readily deviate.

On the other hand, when the cylindrical film Fm is not sandwiched by the horn 21 and the anvil 22 due to, for example, damage, meandering, and/or the like of the film F, the horn 21 ultrasonically vibrates in a state in which the distal end surface of the horn 21 is in contact with the anvil 22 or in a state in which the distal end surface of the horn 21 is positioned very near the anvil 22. The anvil 22 therefore directly receives the ultrasonic vibration energy of the horn 21. The anvil 22 is a metal member secured to the tube 11, and acts so as to stop the ultrasonic vibrations of the horn 21. Accordingly, the frequency of the ultrasonic vibrations of the horn 21 is reduced by the resistance of the anvil 22 to the ultrasonic vibrations of the horn 21. The output value of the frequency of the ultrasonic transmitter 24 thereby deviates considerably.

In the present embodiment, the first film detection sensor 51 determines whether the cylindrical film Fm is sandwiched by the horn 21 and the anvil 22 in accordance with the magnitude of the deviation in the output value of the frequency of the ultrasonic transmitter 24. Specifically, the first film detection sensor 51 determines that the cylindrical film Fm is not sandwiched by the horn 21 and the anvil 22 in response to the magnitude of the deviation in the output value of the frequency of the ultrasonic transmitter 24 being greater than a predetermined value. In this circumstance, the controller 29 performs a control operation for stopping the ultrasonic transmitter 24 and the pull-down belt mechanism 23.

(4) Characteristics of the Form-Fill-Seal Machine (4-1)

In the present embodiment, the first film detection sensor 51 can detect whether or not the cylindrical film Fm is sandwiched by the horn 21 and the anvil 22 in the process of vertically sealing the cylindrical film Fm. The anvil 22 repeatedly collides with the distal end surface of the horn 21 due to the ultrasonic vibrations of the horn 21 in a circumstance in which the cylindrical film Fm is not sandwiched by the horn 21 and the anvil 22 due to damage, meandering, and/or the like of the film F. The strength and the like of the horn 21 and the anvil 22 is thereby reduced and readily deteriorated. In the present embodiment, the controller 29 stops the ultrasonic transmitter 24, whereby the horn 21 and the anvil 22 can be prevented from colliding with each other in a circumstance in which the first film detection sensor 51 detects that the cylindrical film Fm is not sandwiched by the horn 21 and the anvil 22. Deterioration of components can therefore be prevented in the form-fill-seal machine 100 according to the present embodiment.

(4-2)

The form-fill-seal machine 100 according to the present embodiment is provided with two units, the first film detection sensor 51 and the second film detection sensor 52, as units for detecting whether the cylindrical film Fm is sandwiched by the horn 21 and the anvil 22. The second film detection sensor 52, which is a photoelectric sensor, is the core unit for detecting the cylindrical film Fm. On the other hand, the first film detection sensor 51 is a supplemental unit for detecting the cylindrical film Fm, and is a backup unit for the second film detection sensor 52. In the present embodiment, the first film detection sensor 51 detects whether the cylindrical film Fm is sandwiched by the horn 21 and the anvil 22 even in a circumstance in which the second film detection sensor 52 did not operate normally due to failure or the like. The form-fill-seal machine 100 according to the present embodiment therefore has greater reliability in relation to detecting the cylindrical film Fm in comparison with a form-fill-seal machine provided with only one film detection mechanism.

(4-3)

In the form-fill-seal machine 100 according to the present embodiment, the controller 29 performs a control operation for stopping the ultrasonic transmitter 24 and the pull-down belt mechanism 23 in a circumstance in which the first film detection sensor 51 or the second film detection sensor 52 did not detect the cylindrical film Fm. The ultrasonic vibrations of the horn 21 and conveyance of the cylindrical film Fm are thereby stopped. In the form-fill-seal machine 100 according to the present embodiment, the functioning and operation of the form-fill-seal machine 100 can therefore be reliably stopped during an abnormality.

(5) Modifications

An embodiment of the present invention was described above, but the specific configuration of the present invention can be modified within a scope that does not deviate from the substance of the present invention. Modifications applicable to the present embodiment will be described below.

(5-1) Modification A

In the form-fill-seal machine 100 according to the present embodiment, the first film detection sensor 51 monitors the output value of the frequency of the ultrasonic transmitter 24 in real time, and detects whether the cylindrical film Fm is sandwiched by the horn 21 and the anvil 22 by sensing a deviation in the output value. However, the first film detection sensor 51 may, for example, monitor the output value of the amplitude of the ultrasonic transmitter 24 in real time, or may monitor the output value of another parameter expressing a condition of the ultrasonic vibrations in real time.

There is described in the present modification a circumstance in which the first film detection sensor 51 monitors the output value of the amplitude of the ultrasonic transmitter 24 in real time. The anvil 22 acts to stop the ultrasonic vibrations of the horn 21 in a circumstance in which the cylindrical film Fm is not sandwiched by the horn 21 and the anvil 22 due to damage, meandering, and/or the like of the film F, as described above. The amplitude of the ultrasonic vibrations of the horn 21 is reduced due to the resistance of the anvil 22 to the ultrasonic vibrations of the horn 21. The output value of the amplitude of the ultrasonic transmitter 24 thereby deviates considerably. In this circumstance, the first film detection sensor 51 senses a deviation in the output value of the amplitude of the ultrasonic transmitter 24, and detects that the cylindrical film Fm is not sandwiched by the horn 21 and the anvil 22. Deterioration of components can therefore be prevented even in the form-fill-seal machine in the present modification.

(5-2) Modification B

In the form-fill-seal machine 100 according to the present embodiment, the vertical sealing mechanism 2 has a first film detection sensor 51 for detecting the cylindrical film Fm, but the lateral sealing mechanism 3 may have a film detection mechanism that corresponds to the first film detection sensor 51. In the present modification, the lateral sealing mechanism 3 is an ultrasonic sealing device in which the ultrasonically vibrating sealing jaws 31 fuse and laterally seal the cylindrical film Fm. The film detection mechanism of the lateral sealing mechanism 3 detects whether the cylindrical film Fm is sandwiched by the pair of sealing jaws 31 by sensing a deviation in the frequency or other output value of the ultrasonic transmitter in the same manner as in the present embodiment. In addition, the lateral sealing mechanism 3 may further have another film detection mechanism that corresponds to the second film detection sensor 52 of the present embodiment.

(5-3) Modification C

In the form-fill-seal machine 100 according to the present embodiment, a photoelectric sensor is used as the second film detection sensor 52, but another type of sensor may be used. For example, a sensor that uses a film detection roller, a vacuum leak detection sensor, an ultrasonic sensor, or other sensor may be used as the second film detection sensor 52.

The present modification will be described next in which a sensor that uses a film detection roller is used as the second film detection sensor 52. The film detection roller is disposed in the vicinity of the tube 11 of the forming mechanism 1, and is pressed against the tube 11 by low pressure. The cylindrical film Fm downwardly conveyed by the pull-down belt mechanism 23 passes between the film detection roller and the tube 11 during normal functioning of the form-fill-seal machine 100. In this circumstance, the film detection roller rotates due to the conveyed cylindrical film Fm. However, the cylindrical film Fm does not pass between the film detection roller and the tube 11 in a circumstance in which the cylindrical film Fm is not downwardly conveyed by the pull-down belt mechanism 23. In this circumstance, the film detection roller does not rotate. The second film detection sensor 52 can detect whether the cylindrical film Fm is being conveyed by sensing the presence or absence of rotation of the film detection roller, and can indirectly detect whether the cylindrical film Fm is sandwiched by the horn 21 and the anvil 22.

The present modification will be described next in which a vacuum leak detection sensor is used as the second film detection sensor 52. The pull-down belt mechanism 23 has a vacuum mechanism for drawing in and chucking the cylindrical film Fm to the belt. Accordingly, a gap is formed between the pull-down belt mechanism 23 and the tube 11 when the cylindrical film Fm is downwardly conveyed by the pull-down belt mechanism 23. In a circumstance in which the cylindrical film Fm is chucked to the pull-down belt mechanism 23, the space in the vacuum mechanism for drawing in the cylindrical film Fm is in a low-pressure state in which vacuum pressure is maintained. However, in a circumstance in which the cylindrical film Fm is not chucked to the pull-down belt mechanism 23, the space in the vacuum mechanism for drawing in the cylindrical film Fm is in a state in which the vacuum pressure is reduced. The vacuum leak detection sensor can therefore sense a vacuum leak in the vacuum mechanism by measuring a change in the vacuum pressure inside of the vacuum mechanism of the pull-down belt mechanism 23. In a circumstance in which a vacuum leak in the vacuum mechanism was detected, the cylindrical film Fm is not chucked to the pull-down belt mechanism 23, and the cylindrical film Fm is therefore not being conveyed by the pull-down belt mechanism 23. Accordingly, the vacuum leak detection sensor, which is used as the second film detection sensor 52, can detect whether the cylindrical film Fm is being conveyed by sensing the presence or absence of a vacuum leak in the vacuum mechanism, and can indirectly detect whether the cylindrical film Fm is sandwiched by the horn 21 and the anvil 22.

(5-4) Modification D

In the form-fill-seal machine 100 according to the present embodiment, the first film detection sensor 51 detects whether the cylindrical film Fm is sandwiched by the horn 21 and the anvil 22 on the basis of a deviation in the output value of the frequency of the ultrasonic transmitter 24, but may detect whether the cylindrical film Fm is sandwiched by the horn 21 and the anvil 22 on the basis of the distance between the horn 21 and the anvil 22. For example, the horn 21 is in contact with the anvil 22 in a circumstance in which the cylindrical film Fm is not sandwiched by the horn 21 and the anvil 22. In this circumstance, the first film detection sensor 51 detects that the distance between the horn 21 and the anvil 22 is zero. On the other hand, the first film detection sensor 51 detects that the distance between the horn 21 and the anvil 22 is equal to the thickness of the cylindrical film Fm in a circumstance in which the cylindrical film Fm is sandwiched by the horn 21 and the anvil 22.

Figure 4:
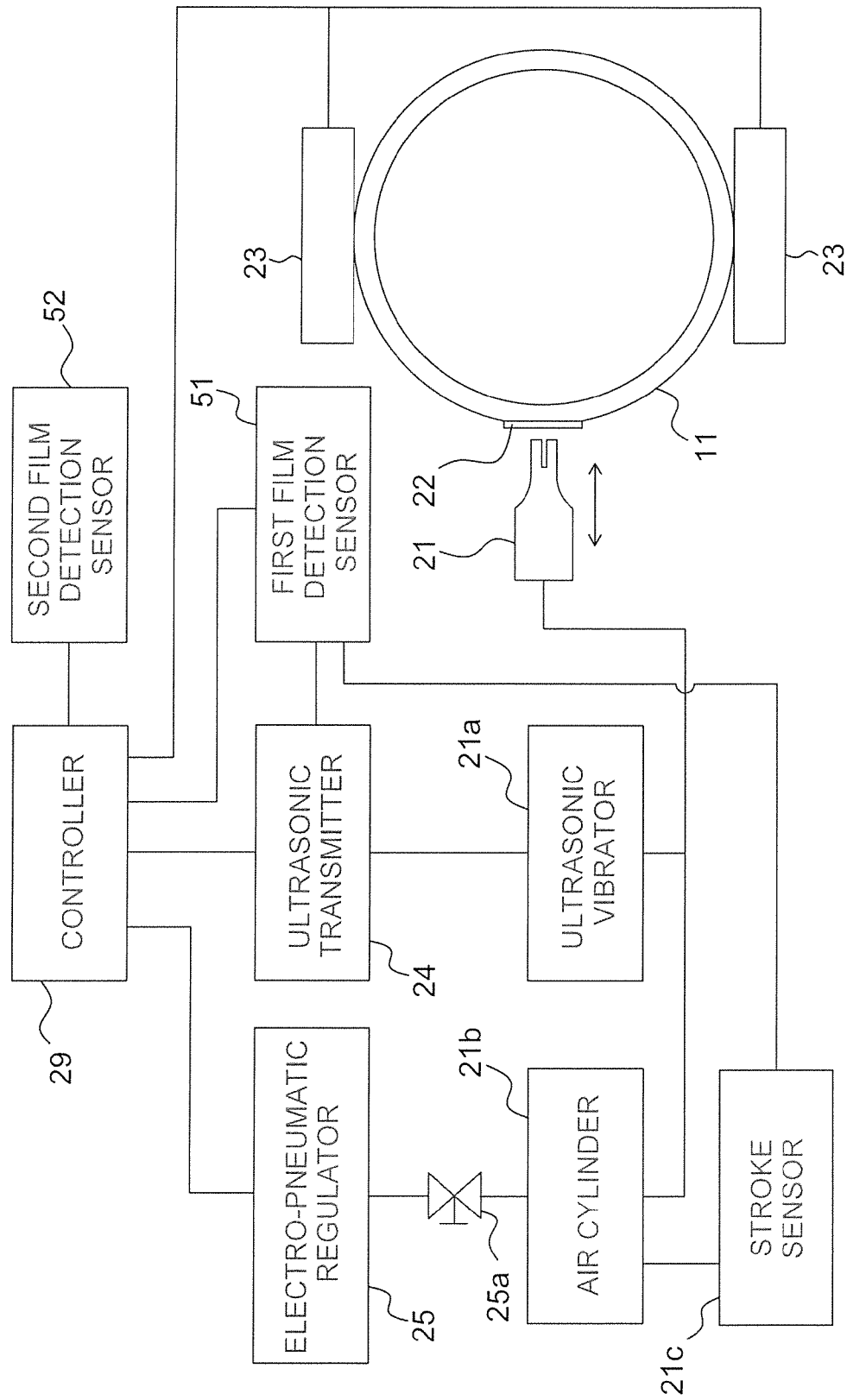
FIG. 4 is an example of a block diagram of the vertical sealing mechanism according to modification D of the present invention.

A form-fill-seal machine 100 provided with a stroke sensor 21c, which is a sensor for sensing the number of strokes, i.e. the travel of the translational movement of the air cylinder 21b in the longitudinal direction, will be described as an example of the present modification. The stroke sensor 21c is connected to the air cylinder 21b and the first film detection sensor 51, as shown in FIG. 4. The stroke sensor 21c is a linear potentiometer, magnetostrictive linear displacement sensor, or the like. The first film detection sensor 51 calculates the travel of the horn 21 on the basis of the number of strokes of the air cylinder 21b sensed by the stroke sensor 21c, and senses the distance between the horn 21 and the anvil 22.

In addition, a form-fill-seal machine 100 provided with a distance sensor 21d, which is a sensor for measuring the distance between the horn 21 and the anvil 22, will be described as an example of the present modification. The distance sensor 21d is connected to the first film detection sensor 51, as shown in FIG. 5. The distance sensor 21d is disposed in the vicinity of the horn 21, and measures the distance between the horn 21 and the anvil 22 when pressure is applied. The first film detection sensor 51 senses the distance between the horn 21 and the anvil 22 on the basis of the measured results of the distance sensor 21d.

(5-5) Modification E

In the form-fill-seal machine 100 according to the present embodiment, the first film detection sensor 51 detects whether the cylindrical film Fm is sandwiched by the horn 21 and the anvil 22 on the basis of a deviation in the output value of the frequency of the ultrasonic transmitter 24, but may detect whether the cylindrical film Fm is sandwiched by the horn 21 and the anvil 22 on the basis of the electric resistance between the horn 21 and the anvil 22.

Figure 6:
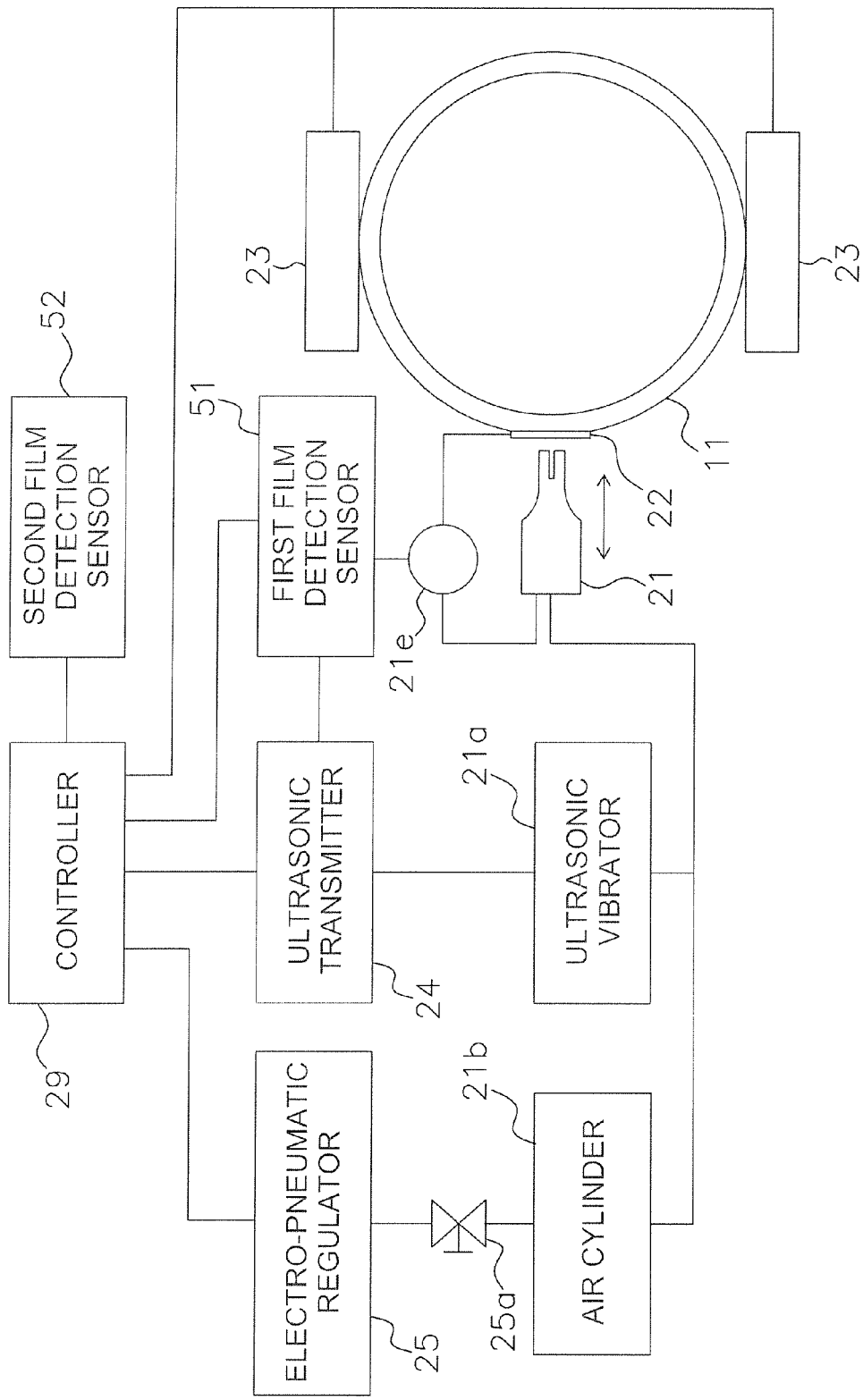
FIG. 6 is a block diagram of the vertical sealing mechanism according to modification E of the present invention.

A form-fill-seal machine 100 provided with an insulation resistance tester 21e will be described as an example of the present modification. The insulation resistance tester 21e measures the electric resistance between the horn 21 and the anvil 22 in a state in which one pole of the insulation resistance tester is connected to the horn 21 and the other pole is connected to the anvil 22, as shown in FIG. 6. The insulation resistance tester 21e is connected to the first film detection sensor 51. The horn 21 and the anvil 22 are conductors, and the cylindrical film Fm is an insulator. Accordingly, the electric resistance between the horn 21 and the anvil 22 expresses a high value in a circumstance in which the cylindrical film Fm is sandwiched by the horn 21 and the anvil 22 when pressure is applied. In addition, the electric resistance between the horn 21 and the anvil 22 expresses a low value because the space between the horn 21 and the anvil 22 conducts electricity in a circumstance in which the cylindrical film Fm is not sandwiched by the horn 21 and the anvil 22 when pressure is applied.

REFERENCE SIGNS LIST

2 Vertical sealing mechanism (sealer)
21 Horn
22 Anvil
23 Pull-down belt mechanism (conveyor)
24 Ultrasonic transmitter (ultrasonic unit)
29 Controller
51 First film detection sensor (first detector)
52 Second film detection sensor (second detector)
100 Form-fill-seal machine
Fm Cylindrical film (packaging material)

What is claimed is:

1. A form-fill-seal machine comprising:
   a conveyor for conveying a cylindrically shaped packaging material;
   a sealer coupled to the conveyor, the sealer having a horn, an anvil, and an ultrasonic unit linked to the horn and transmitting ultrasonic vibrations to the horn, the packaging material conveyed by the conveyor being sandwiched between the horn and the anvil such that the horn applies ultrasonic vibrations to the packaging material to seal portions of the packaging material, the horn and the anvil being located at a first height relative to the conveyor;
   a first detector detecting whether or not the packaging material is sandwiched by the horn and the anvil in response to a change in the state of the ultrasonic vibrations transmitted to the horn by the ultrasonic unit;
   a second detector detecting the presence or absence of the packaging material at a second height relative to the conveyor, the second height being lower than the first height; and
   a controller configured to stop operation of the ultrasonic unit in response to the first detector detecting that the packaging material is not sandwiched by the horn and the anvil; and the controller being further configured to stop the ultrasonic unit and stop conveyance of the packaging material by the conveyor in response to the second detector detecting the absence of the packaging material at the second height.

2. The form-fill-seal machine according to claim 1, wherein
   the first detector detects whether the packaging material is sandwiched by the horn and the anvil in response to a change in distance between the horn and the anvil.

3. The form-fill-seal machine according to claim 1, wherein
   the first detector detects whether the packaging material is sandwiched by the horn and the anvil in response to a change in electric resistance between the horn and the anvil.

4. The form-fill-seal machine according to claim 1, wherein
   the controller further stops conveyance of the packaging material by the conveyor in response to the first detector detecting that the packaging material is not sandwiched by the horn and the anvil.

5. The form-fill-seal machine according to claim 2, wherein
   the controller further stops conveyance of the packaging material by the conveyor in response to the first detector detecting that the packaging material is not sandwiched by the horn and the anvil.

6. The form-fill-seal machine according to claim 3, wherein
   the controller further stops conveyance of the packaging material by the conveyor in response to the first detector detecting that the packaging material is not sandwiched by the horn and the anvil.

* * * * *